(12) United States Patent
Hafner et al.

(10) Patent No.: US 11,097,384 B2
(45) Date of Patent: Aug. 24, 2021

(54) MECHANICAL CERAMIC MATRIX COMPOSITE (CMS) REPAIR

(71) Applicant: General Electric Company, Schenectady, NY (US)

(72) Inventors: Matthew Troy Hafner, Honea Path, SC (US); John Ellington Greene, Greenville, SC (US)

(73) Assignee: General Electric Company, Schenectady, NY (US)

(*) Notice: Subject to any disclaimer, the term of this patent is extended or adjusted under 35 U.S.C. 154(b) by 183 days.

(21) Appl. No.: 16/254,855

(22) Filed: Jan. 23, 2019

(65) Prior Publication Data

US 2020/0230752 A1 Jul. 23, 2020

(51) Int. Cl.
*B23P 6/00* (2006.01)
*C04B 35/80* (2006.01)
*C04B 41/00* (2006.01)
*C04B 41/53* (2006.01)
*C04B 41/91* (2006.01)
*C04B 37/02* (2006.01)

(52) U.S. Cl.
CPC .......... *B23P 6/005* (2013.01); *C04B 35/806* (2013.01); *C04B 37/02* (2013.01); *C04B 41/009* (2013.01); *C04B 41/5338* (2013.01); *C04B 41/91* (2013.01); *C04B 2235/3826* (2013.01); *C04B 2235/5244* (2013.01); *C04B 2237/38* (2013.01); *C04B 2237/405* (2013.01); *C04B 2237/406* (2013.01)

(58) Field of Classification Search
CPC ......... Y10T 29/49318; Y10T 29/49732; Y10T 29/49734; Y10T 29/49735; Y10T 29/49737; B23P 6/002; B23P 6/005
See application file for complete search history.

(56) References Cited

U.S. PATENT DOCUMENTS

| | | | |
|---|---|---|---|
| 5,928,448 A * | 7/1999 | Daws | B23P 6/00 156/92 |
| 6,820,334 B2 | 11/2004 | Kebbede et al. | |
| 6,960,738 B2 * | 11/2005 | Weekamp | B32B 18/00 219/121.64 |
| 7,198,860 B2 | 4/2007 | Vance | |
| 7,310,949 B2 * | 12/2007 | Carper | C23C 26/00 60/772 |
| 9,366,140 B2 | 6/2016 | Chamberlain | |
| 10,406,640 B2 * | 9/2019 | Harris | C04B 35/62884 |
| 10,834,790 B2 * | 11/2020 | Harris | C04B 35/62868 |

(Continued)

FOREIGN PATENT DOCUMENTS

WO WO-2017200401 A1 * 11/2017 ........... B23K 26/342

*Primary Examiner* — Jason L Vaughan
(74) *Attorney, Agent, or Firm* — Hoffman Warnick LLC

(57) ABSTRACT

Various embodiments include a metal-repaired ceramic matrix composite (CMC) article, and a method of repairing a CMC article having a defect. Particular embodiments include a method including: removing a defect-containing portion of the CMC article; forming at least one opening in a remaining portion of the CMC article; preparing a metal repair preform for replacing at least the removed portion of the CMC article, wherein a portion of the metal repair preform complements the at least one opening; and attaching the metal repair preform to the remaining portion of the CMC article.

13 Claims, 5 Drawing Sheets

(56) References Cited

U.S. PATENT DOCUMENTS

| | | | |
|---|---|---|---|
| 2015/0093249 A1* | 4/2015 | Lang | F01D 5/14 |
| | | | 416/241 B |
| 2015/0345308 A1* | 12/2015 | Roberts, Jr. | F01D 11/08 |
| | | | 416/212 A |
| 2018/0216464 A1* | 8/2018 | Bezanson | G06F 30/17 |
| 2018/0371914 A1* | 12/2018 | Karigiannis | G06N 3/0454 |
| 2019/0176273 A1* | 6/2019 | Srinivasan | B23K 26/342 |

\* cited by examiner

US 11,097,384 B2

MECHANICAL CERAMIC MATRIX COMPOSITE (CMS) REPAIR

TECHNICAL FIELD

The present disclosure generally relates to ceramic matrix composite (CMC) article repair, and more particularly to mechanical repair of CMC components of a gas turbine engine.

BACKGROUND

Ceramic matrix composite (CMC) articles are generally considered well suited for structural components of a turbine engine due to, for example, their thermal resistance, high temperature strength, and chemical stability. However, CMC articles are typically brittle. Thus, CMC components in a turbine engine can suffer from damage due to overstressing, impact, improper formation, etc. Conventional techniques for repairing damaged CMC articles include replacing missing portions of a CMC article with additional fiber or matrix or a combination thereof, and re-infiltrating damaged portions of a CMC article. These conventional techniques are expensive due to the costly nature of CMC and such repaired CMC articles are still susceptible to further damage due to the brittleness of the CMC.

BRIEF SUMMARY

Metal-repaired ceramic matrix composite (CMC) articles and methods of forming the same are disclosed. In a first aspect of the disclosure, a method of repairing a CMC article comprising a defect includes: removing a defect-containing portion of the CMC article; forming at least one opening in a remaining portion of the CMC article; preparing a metal repair preform for replacing at least the removed portion of the CMC article, wherein a portion of the metal repair preform complements the at least one opening; and attaching the metal repair preform to the remaining portion of the CMC article.

In a second aspect of the disclosure, a metal-repaired CMC article includes: a CMC portion having at least one opening therein; and a metal repair portion attached to the CMC portion and including at least one metal that is non-reactive with the CMC portion at temperatures of 1500° F. or below, the metal repair portion having a portion that complements the at least one opening of the CMC portion.

In a third aspect of the disclosure, a metal-repaired CMC shroud for a gas turbine engine includes: a CMC portion having at least one opening therein and including silicon carbon fiber reinforced silicon carbide (SiC/SiC); and a metal repair portion attached to the CMC portion and including a nickel alloy (Ni-alloy) or a stainless steel, the metal repair portion having a portion that complements the at least one opening of the CMC portion.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
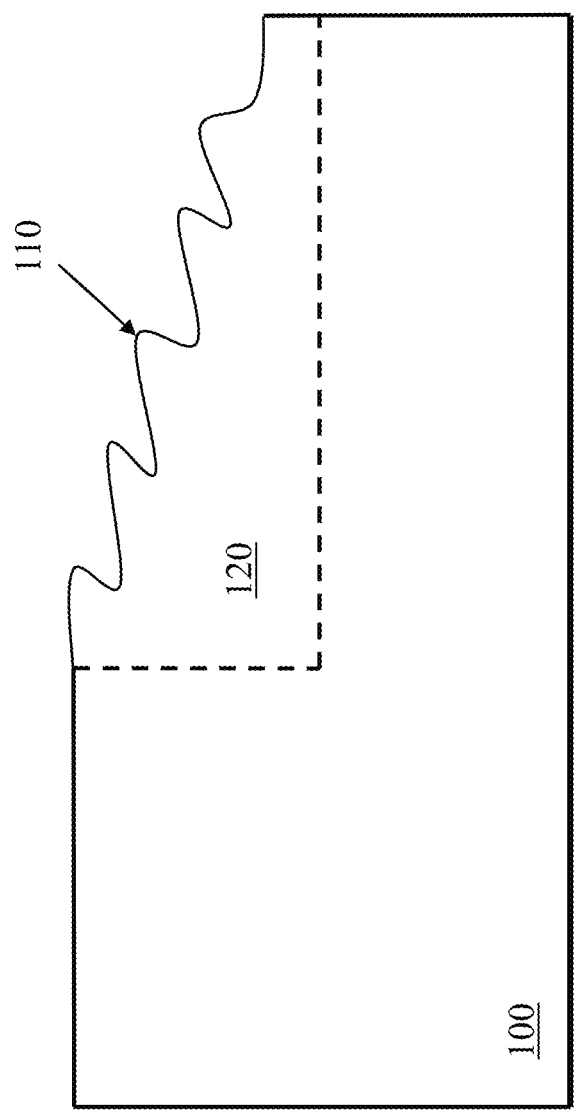
FIG. 1 shows a ceramic matrix composite (CMC) article having a defect.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

The present disclosure generally relates to ceramic matrix composite (CMC) article repair, and more particularly, to mechanical repair of CMC components of a gas turbine engine. As noted above, conventional techniques for repairing damaged CMC articles include replacing missing portions with additional fiber or matrix or a combination thereof and re-infiltrating damaged portions of a CMC article. However, such techniques are expensive due to the costly nature of CMC and these types of repaired CMC articles are still susceptible to further damage due to the brittleness of the CMC. In contrast to convention, various aspects of the disclosure include mechanically repairing a defect-containing CMC article with metal. Such metal-repaired CMC articles are less expensive than CMC-repaired CMC articles due to lower metal cost as compared to CMC, and such metal-repaired CMC articles may have a longer life expectancy than CMC-repaired CMC articles due to lower susceptibility to damage as compared to CMC, especially in areas prone to vibration. In addition, the metal-repaired CMC articles of the disclosure afford an improved production yield by providing a less expensive and simpler technique for repairing out-of-spec newly produced parts as compared with conventional approaches.

FIG. 1 depicts a CMC article 100 comprising a defect 110. CMC article 100 may be a portion of a shroud of a gas turbine engine (not shown). "CMC" as used herein refers to ceramic matrix composite wherein ceramic fibers are embedded in a ceramic matrix. CMC article 100 may include a ceramic matrix continuously or discontinuously reinforced with ceramic fibers. The ceramic matrix may include carbon (C), silicon carbide (SiC), aluminum oxide ($Al_2O_3$) and/or aluminum silicate ($Al_2O_3$—$SiO_2$). The ceramic fibers may include carbon (C), silicon carbide (SiC), aluminum oxide ($Al_2O_3$) and/or aluminum silicate ($Al_2O_3$—$SiO_2$). The ceramic matrix and the ceramic fibers may be composed of the same material or they may be different. For instance, when the ceramic matrix and the ceramic fibers are composed of the same material, CMC article 100 may be, for example, a silicon carbide fiber reinforced silicon carbide (SiC/SiC) article. When the ceramic matrix and the ceramic fibers are composed of different materials, CMC article 100 may be, for example, a carbon fiber reinforced silicon carbide (C/SiC) article. CMC article 100 may be made from any suitable manufacturing process known in the art such as, for example, injection molding, slip casting, tape casting, infiltration methods (e.g., chemical vapor infiltration, melt infiltration, etc.) and various other suitable methods and/or processes.

The defect 110 in CMC article 100 may be the result of, for example, damage due to overstressing, impact, improper original formation/manufacture, etc. For instance, the defect 110 may be a crack due to overstressing, a gouge or break due to impact, a non-desirable surface contour due to improper original formation/manufacture, etc. The geometry/shape of defect 110 as depicted in FIG. 1 is merely for illustrative purposes, and is not intended to reflect any specific defect. Defect 110 may have any size or shape possible from the type of damage incurred.

FIG. 1 also depicts a portion 120 (dotted lines) of CMC article 100 that has been selected for removal. Portion 120 (also referred to as "defect-containing portion") includes defect 110 such that upon removal of portion 120, defect 110 is no longer present. Removal of portion 120 can be accomplished by any now known or later developed removal process such as, but not limited to, machining, ablation, abrasion and etching.

Figure 2:
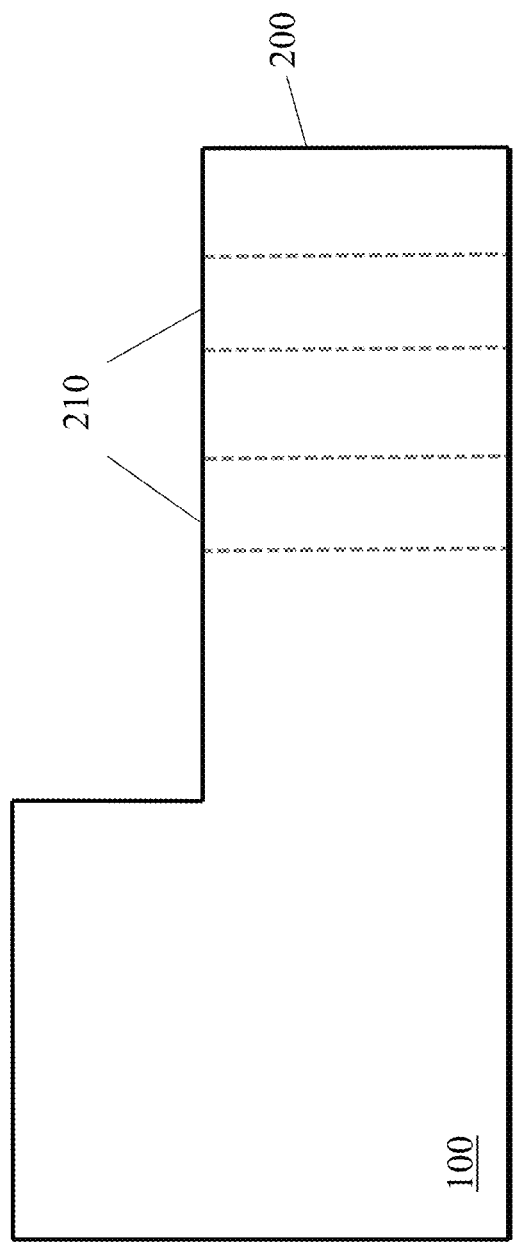
FIG. 2 shows the CMC article after repair preparation with at least one opening (e.g., two holes) formed therein and a defect-containing portion removed therefrom.

FIG. 2 depicts a remaining portion 200 of CMC article 100 after removal of defect-containing portion 120 as mentioned above with respect to FIG. 1. Also depicted in FIG. 2 is the formation of at least one opening 210 (semi-transparent dotted lines) in remaining portion 200. Two openings 210 are shown, however any number of opening may be used. Openings 210 may be one or more of a hole (as shown), a groove, a slot, etc. Such holes, grooves, slots, etc. may extend wholly or partially through remaining portion 200 of CMC article 100 and may have any geometry, including geometries that assist in the retention of a metal repair preform (discussed below). Similar to the removal process for defect-containing portion 120, removal of CMC material from CMC article 100 to create openings 210 may be accomplished by any now known or later developed removal process such as, but not limited to, machining, ablation, abrasion and etching. In the instance of openings 210 being holes, for example, an inexpensive and simple machining technique may be used to create holes 210. This may add to the overall simpler and less expensive nature of the processes of the disclosure as compared to conventional CMC repair methods. The removal of CMC material to create openings 210 may occur after or contemporaneously with the removal of defect-containing portion 120. Thus, the removal techniques for creating openings 210 and removing defect-containing portion 120 may the same, adding even further to the overall simpler and less expensive nature of the processes of the disclosure.

Figure 3:
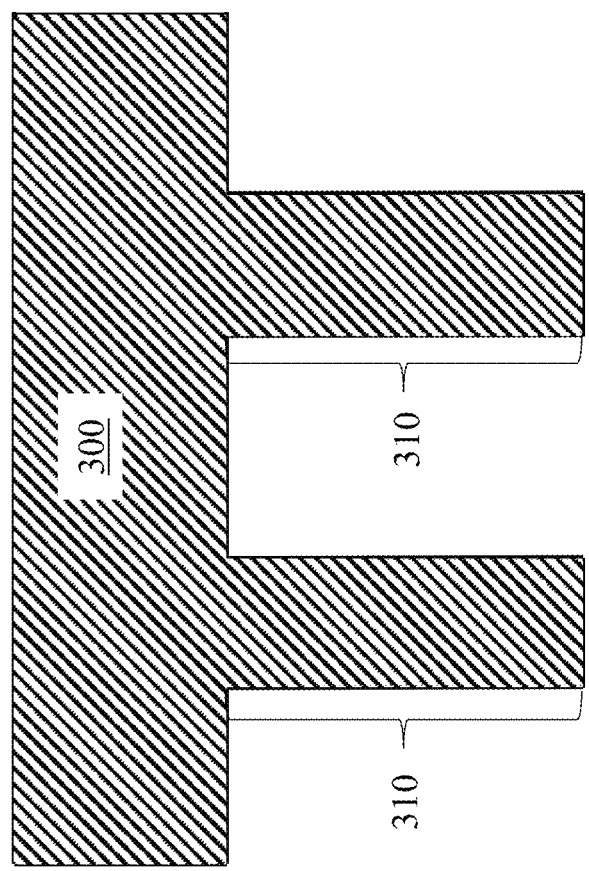
FIG. 3 shows a metal repair preform having a portion thereof that complements (e.g., fits into) the at least one opening of the CMC article prepped for repair.

FIG. 3 depicts a metal repair preform 300. Metal repair preform 300 may be formed from any one or more metals that are non-reactive with CMC article 100 at temperatures of 1500° F. or below. The metal repair preform 300 may be composed of a nickel alloy (Ni-alloy) or a stainless steel. Ni-alloys may include nickel alloyed with one or more of copper (Cu), iron (Fe), chromium (Cr), aluminum (Al) and silicon (Si). Stainless steels may include austenitic stainless steel, ferritic stainless steel, martensitic stainless steel and duplex stainless steel. Forming repair preform 300 from one or more of the above-discussed metals provides for a less costly repair preform as compared to a repair preform formed from more expensive CMC material. In addition, repair preform 300 being formed from one or more of the above-discussed metals may have extended part life as compared to a repair preform from CMC material that is brittle and susceptible to damage, especially when the part is located in an area prone to vibration.

Metal repair preform 300 includes at least one portion 310 that is sized to complement (e.g., fits into) opening(s) 210 of CMC article 100 (FIG. 2). Additionally, metal repair preform 300 replaces at least removed defect-containing portion 120 of CMC article 100 (FIG. 1). Portion(s) 310 of metal repair preform 300 that complement/fit into opening(s) 210 may be integral with the remaining portion of metal repair preform 300 or may be attached thereto. Portion(s) 310 may have any geometry that allows for fitting into opening(s) 210.

Figure 4:
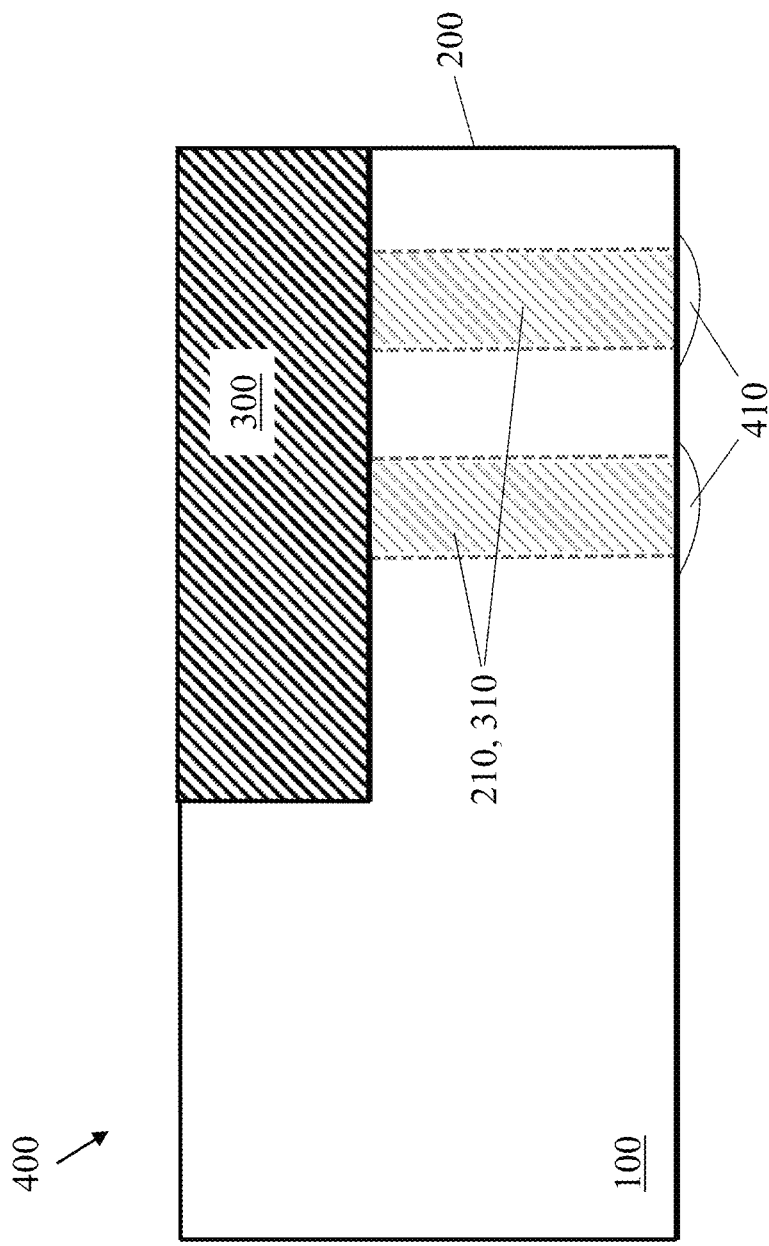
FIG. 4 shows the metal repair preform attached to the CMC article prepped for repair.

FIG. 4 depicts a repaired CMC article 400. Repaired article 400 includes metal repair preform 300 attached to remaining portion 200 of CMC article 100. As can be seen in FIG. 4, portions 310 of metal repair preform 300 fit into openings 210 of remaining portion 200 of CMC article 100. As can also be seen in FIG. 4, the combination of metal repair preform 300 and remaining portion 200 of CMC article 100 form repaired CMC article 400 that has minimized or removed (shown) defect 110 (FIG. 1) such that article 400 is placed into compliance with desired or original specifications. Repaired CMC article 400 can be formed by inserting metal repair preform 300 into the complementary openings 210 located in the remaining portion 200 of CMC article 100, followed by attaching.

Metal repair preform 300 may be attached to remaining portion 200 of CMC article 100 by any now known or later developed techniques. A simple and inexpensive attachment technique may include mechanical attachment. Such mechanical attachment may include, for example, riveting, bolting, welding, snapping, pinning, pressure fitting, and male/female mating. While rivets 410 are shown in FIG. 4 as the means of attaching and retaining metal repair preform 300 to remaining portion 200 of CMC article 100, this is merely for illustrative purposes. Another mechanical attachment technique may include, for example, mere interlocking of the components via complementary geometries of metal repair preform 300 and remaining portion 200 of CMC article 100 (e.g., male/female mating). Such interlocking may be slot-style, tongue/groove-style, dovetail-style, etc.

Figure 5:
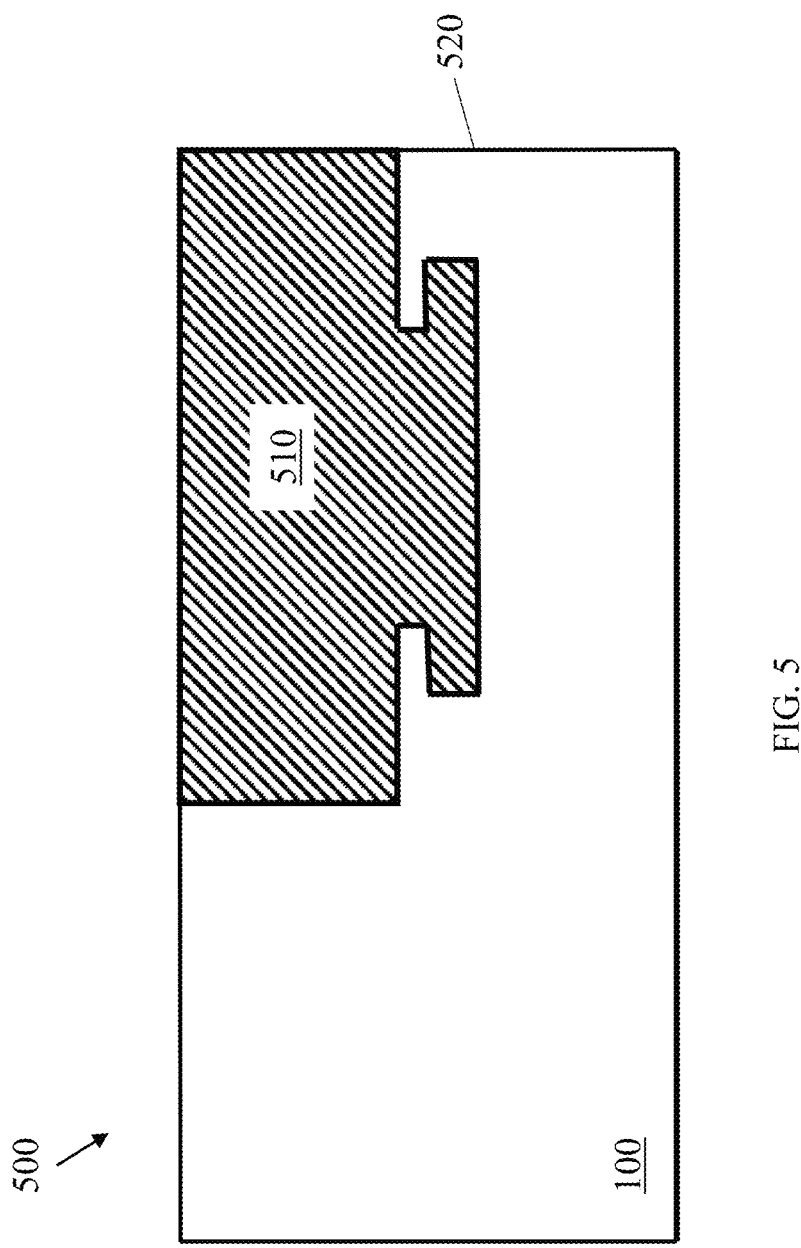
FIG. 5 shows an alternate metal repair preform attached to an alternate CMC article prepped for repair and having at least one opening (e.g., slot) formed therein.

FIG. 5 depicts an alternate embodiment where slot-style interlocking geometries of a metal repair preform 510 and a remaining portion 520 of CMC article 100 form alternative repaired CMC article 500. The geometries of FIG. 5 are simplified for illustration purposes only, any geometries may be utilized with varying levels of complexity. In this alternate embodiment, repaired CMC article 500 can be formed by inserting (e.g., sliding) metal repair preform 510 into the complementary slot located in the remaining portion 520 of CMC article 100. Additional retention measures (e.g. affixing) of metal repair preform 510 within CMC article 100 after insertion may be utilized.

The repaired CMC articles of the disclosure may be used in a gas turbine engine, for example, as a repaired CMC shroud. These metal-repaired CMC articles of the disclosure are less costly than their CMC-repaired counterparts and are expected to have a longer part life. In addition, the methods of the disclosure for preforming the repair of CMC articles are less complex (easier) and less expensive than the methods associated with conventional CMC-repaired articles.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

We claim:

1. A method of repairing a ceramic matrix composite (CMC) article comprising a defect, the method comprising:
    removing a defect-containing portion of the CMC article;
    forming at least one opening in a remaining non-defect-containing portion of the CMC article, the at least one opening having a geometrical profile distinct from the removed defect-containing portion of the CMC article;
    preparing a metal repair preform for replacing at least the removed portion of the CMC article, wherein a portion of the metal repair preform includes:
        a body having a same geometrical profile as the removed defect-containing portion of the CMC article,
        a protrusion extending outwardly from the body and shaped to complement a first portion of the at least one opening, and
        a retention segment extending from the protrusion, and shaped to complement a second portion of the at least one opening; and
    attaching the metal repair preform to the remaining non-defect-containing portion of the CMC article, wherein the retention segment within the second portion of the opening mechanically joins the metal repair preform to the CMC article.

2. The method of claim 1, wherein removing the defect-containing portion includes one or more of machining, ablation, abrasion or etching.

3. The method of claim 1, wherein the at least one opening is formed during the removal of the defect-containing portion of the CMC article.

4. The method of claim 1, wherein the retention segment includes a dovetail having a greater width than the protrusion, and wherein the opening includes a dovetail slot shaped to receive the retention segment therein.

5. The method of claim 1, wherein forming the at least one opening includes one or more of machining, ablation, abrasion or etching.

6. The method of claim 1, wherein attaching the metal repair preform includes mechanically attaching the metal repair preform to the remaining non-defect-containing portion of the CMC article by interlocking the geometrical profile of the retention segment with the geometrical profile of the at least one opening.

7. The method of claim 6, wherein mechanically attaching the metal repair preform to the remaining non-defect-containing portion of the CMC article further includes one or more of riveting, bolting, welding or snapping, such that an interface between the remaining portion of the CMC article and the retention segment is free of bonding material therebetween.

8. The method of claim 1, wherein preparing the metal repair preform includes forming the metal repair preform from at least one metal that is non-reactive with the CMC article at temperatures of 1500° F. or below.

9. The method of claim 1, wherein preparing the metal repair preform includes forming the metal repair preform from a nickel alloy (Ni-alloy) or a stainless steel.

10. The method of claim 1, wherein the CMC article includes ceramic fibers embedded in a ceramic matrix,
    the ceramic fibers being selected from the group consisting of carbon (C), silicon carbide (SiC), aluminum oxide ($Al_2O_3$) and aluminum silicate ($Al_2O_3$—$SiO_2$), and
    the ceramic matrix being selected from the group consisting of carbon (C), silicon carbide (SiC), aluminum oxide ($Al_2O_3$) and aluminum silicate ($Al_2O_3$—$SiO_2$).

11. The method of claim 1, wherein the CMC article includes silicon carbide fiber reinforced silicon carbide (SiC/SiC).

12. The method of claim 1, wherein attaching the metal repair preform to the remaining non-defect-containing portion of the CMC article forms a repaired CMC shroud for a gas turbine engine.

13. The method of claim 12, wherein the metal repair preform of the repaired CMC shroud includes a nickel alloy (Ni-alloy) or a stainless steel, and the CMC of the repaired CMC shroud includes silicon carbide fiber reinforced silicon carbide (SiC/SiC).

* * * * *